Aug. 20, 1968  E. A. ZACKHEIM  3,397,814
COMPOSITE LID
Filed Dec. 6, 1966  2 Sheets-Sheet 1
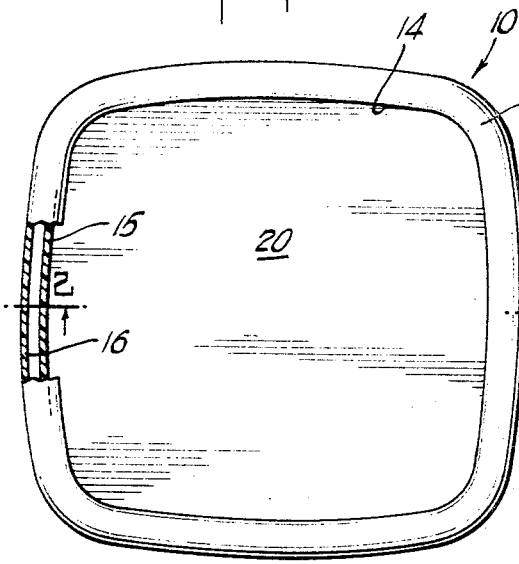
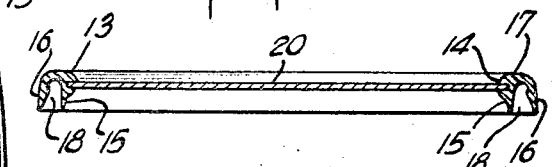
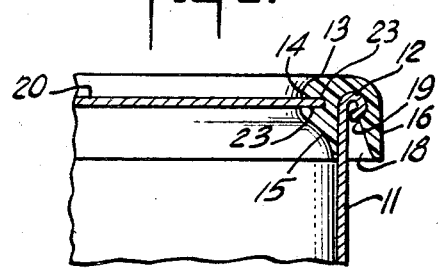
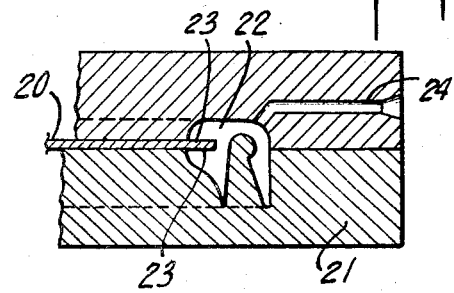
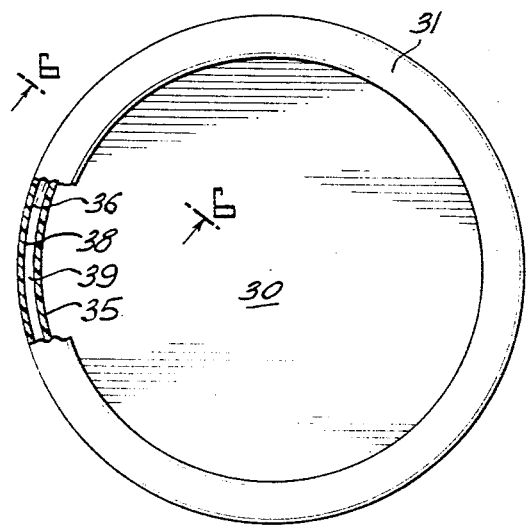
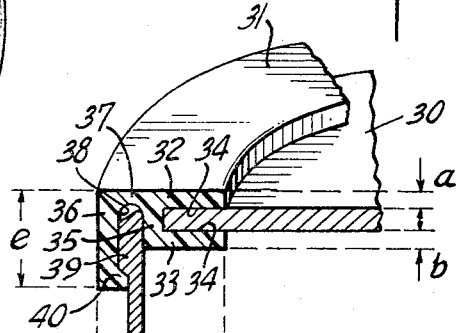
INVENTORS:
ELI A. ZACKHEIM
BY Arnold S. Worfolk
ATTORNEY Aug. 20, 1968   E. A. ZACKHEIM   3,397,814
COMPOSITE LID
Filed Dec. 6, 1966   2 Sheets-Sheet 2

INVENTORS:
ELI A. ZACKHEIM
BY
Arnold J. Worfolk
ATTORNEY

United States Patent Office 3,397,814
Patented Aug. 20, 1968

3,397,814
COMPOSITE LID
Eli A. Zackheim, North Princeton, N.J., assignor to Johnson & Johnson, a corporation of New Jersey
Filed Dec. 6, 1966, Ser. No. 599,436
6 Claims. (Cl. 220—60)

ABSTRACT OF THE DISCLOSURE

A composite container lid of paneling material (preferably fibrous paper board) and plastic material for closing an opening defined by a vertical wall of the container, is injection molded with a central paneling area and an outer plastic rim presenting a depending flange adapted to engage a surface of such vertical wall. A bonded connection between an outer marginal area of the paneling and an inner overlapping marginal area of the plastic material causes the greater dimensional stability of the paneling material to control the shape of the plastic rim by opposing shrinkage in the plastic as it cools after moulding.

---

This invention relates to a composite closure of flexible paneling material and an injection molded thermoplastic peripheral framelike element bonded to the marginal edge of the paneling material and which is adapted to cooperate with the peripheral edge of the container to effect a closure or seal.

Heretofore, closures or lids for containers for cottage cheese, butter, salads, coffee, or the like have been made of fiberboard, plastic or metal. Each has its advantages and disadvantages. Fiberboard is inexpensive to print and may be easily and pleasingly decorated in color, but, it does not seal or reseal too well and oft-times presents a not too prepossessing appearance. Plastic lids may be made to possess all kinds of properties depending upon the plastic selected, the design and method of fabrication, i.e., thermoforming or molding, but their costs may be higher than fiberboard and they may lack the ability to accept the many varied, and beautiful impressions that present day printing techniques are capable of imprinting on fiberboard. Metal closures imprint easily and look prepossessing but are expensive and pose a problem in sealing, resealing and removal because of their inflexible edges.

According to the present invention, a composite lid or closure for a container is formed with a panel of fiberboard, sheet metal, sheet plastic or the like preimprinted, preimpressed, or merely preselected from such material for a given desirable property, and with a peripheral plastic frame injection molded into bonded relationship with the panel along a marginal portion thereof. The plastic frame is molded to present a portion thereof at an angle with respect to the plane of the panel for engagement with a surface presented by a side wall of the container to be closed, thereby to effect a seal between the container and said lid.

The longitudinal dimension of the peripheral plastic frame, i.e., in a direction parallel to its line of bond with the panel material is large in comparison with its cross-sectional dimensions and the injection molding of the plastic frame is such that any lines of stress tending to effect dimensional changes in the plastic upon cooling are exerted longitudinally of the plastic frame. Dimensional stability is imparted to the plastic frame by the paneling with the result that the improved lid may have flexibility or distortability in the container engaging sealing sections thereof equivalent to that of an all plastic lid in the same section, a dimensional stability equivalent to that of the paneling material in the paneling area, and a degree of resistance to overall distortion much less than if the lid were all plastic. These advantages result firstly, because there is far less plastic in the improved lid than in a plastic lid of comparable size, secondly, because dimensional stability is imparted to the plastic by virtue of its bonded engagement with the paneling material, and thirdly, by confining the distortion exerting forces in the plastic to a single direction, i.e., longitudinally of the plastic frame.

A better understanding of the invention may be had from the following description read in conjunction with the accompanying drawings in which:

FIG. 1 is a top plan view of a composite container lid embodying the present improvements, partly broken away to show underlying parts;

FIG. 2 is a transverse sectional view on line 2—2 of FIG. 1;

FIG. 3 is an enlarged, partial transverse sectional view showing the manner in which the lid cooperates with a container;

FIG. 4 is a transverse sectional view through a portion of a mold showing the panel insert material in place prior to the injection molding operation;

FIG. 5 is a top plan view of a composite container lid illustrating a different embodiment of the present improvements;

FIG. 6 is a partial, transverse, sectional view on line 6—6 of FIG. 5;

Figure 8:
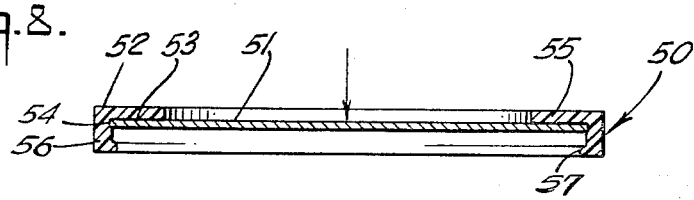
FIG. 8 is a transverse sectional view on line 8—8 of FIG. 7.
Figure 9:
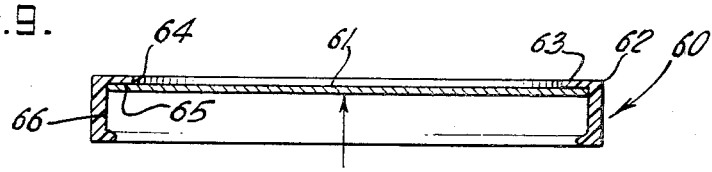
Figure 10:
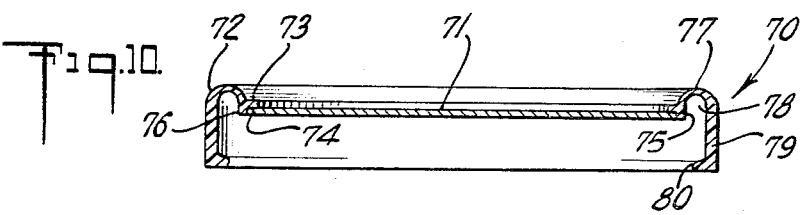
Figure 11:
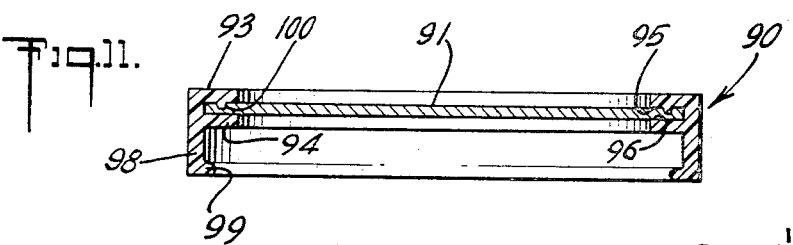

FIGS. 9 to 11 inclusive are transverse sectional views similar to FIG. 8 but illustrating different embodiments of the present improvements.

Referring now to the drawings—there is illustrated in FIGS. 1, 2 and 3 a lid 10 suitable for use with a container 11 having a bead 12 at its upper edge. The lid includes a peripheral marginal injection molded plastic rim 13 and a panel area defined by the inner peripheral edge 14 of the plastic rim. The plastic rim further includes inner and outer downwardly extending lips 15 and 16, bridged at the top by an interconnecting rim portion 17 to define a peripheral groove 18 opening downwardly to accommodate and snugly engage the bead 12 of the container 11 which is closed by the lid. The inner lip 15 may present an outer surface adapted to engage the inner surface of the container while the outer lip 16 preferably possesses an inner surface formed with a ridge 19 extending around the lid which as the outer lip yields or distorts during application of the lid to the container, will slip past and then engage beneath the bead 12 to hold the lid in place.

The plastic rim embraces edgewise a sheet 20 of some flexible material, preferably fiberboard or other material such as metal or plastic sheet. The sheet paneling material used should possesses dimensional stability greater than the rim and if the material is fiberboard or metal it does possess dimensional stability and may be readily and appropriately decorated by techniques well known.

In accordance with the principles disclosed in Patent 3,154,617, paneling material is located in a mold 21 with a peripheral marginal portion thereof projecting into a mold cavity 22 which constitutes a matrix determining the transverse cross section of the plastic rim and which when filled with molten plastic material by injection molding processes forms the plastic frame 13 tightly bonded to the paneling material 20 along marginal areas 23 thereof.

Plastic material entering the mold during injection molding of an all plastic lid fans out in all directions and any locked-in stresses are exerted in all directions. Exposure to heat during shipping in climates where temperatures are high, may relieve these stresses and cause uncontrolled distortion of the plastic. According to the invention, plastic material injected into the mold during formation of a composite lid travels from an entering port 24 longitudinally along the mold cavity 22 and into contact with the marginal areas 23 of the paneling material 20 to effect a bonding relationship therewith. Stresses locked in the plastic, likewise will be relieved say, upon encountering high shipping temperatures, but because of the longitudinal directional travel of the plastic during the injection molding process, all such locked-in stresses are tensional and act longitudinally along the plastic rim. These stresses never reverse to compressive forces and a composite lid accordingly will hold its shape better than an all plastic lid and will exert a more uniform sealing force on the container with which it is used.

The tendency of the composite lid to distort as a result of shrinkage in the plastic material upon removal from the mold is also minimized if the paneling material has greater dimensional stability than the plastic rim member since such dimensional stability is imparted to the plastic through its bonded engagement therewith provided, of course, that the bond is strong enough to resist without rupturing, the forces exerted upon it by the plastic material during shrinkage.

As previously stated, fiberboard and metal have substantially more dimensional stability than has plastic material customarily used in injection molding processes and which tends to shrink when the product molded therefrom is removed from the mold. If there is good bonding between the paneling material and the plastic, and assuming the paneling material does not shrink, no shrinkage will occur in the plastic at its common interface with the paneling material. However, with increased distance away from the plane of the common interface 23 and assuming tendency toward shrinkage in the plastic, the effects of shrinkage in the plastic increases and the composite article may distort in one direction or another, or not at all, depending upon thickness of the plastic material above and below the bonded interface.

In FIG. 6, which illustrates a construction similar to FIGS. 1 to 3, except for greater plastic symmetry in the region of the bonding interfaces, the lid includes paneling material 30, an injection molded rim 31, with sections 32 and 33 above and below the paneling material with bonded interfaces 34 of equal area, a vertical section 35 interconnecting the sections 32, 33 and which together with a depending lip 36 and an interconnecting bridging section 37, presents opposed vertical walls and a top wall of a peripheral groove 38 adapted to accommodate and fit over a thickened reinforced rim 39 at the top of a container to be closed. A nose 40 projecting inwardly, from the lower extremity of lip 36 engages beneath the rim 39 tightly to hold the lid in place.

The plastic frame 31 presents a thickness of plastic $a$ above bonded interface 34 at the top of fiberboard panel 30 and the same thickness $b$ of plastic below bonded interface 34 at the bottom of the panel. Width $c$ of these plastic sections above and below the fiberboard is the same so that there is a balancing out of forces that would tend to warp the lid out of the plane of the paneling material insofar as concerns the plastic material radially within the inner face of underlying groove 38 designed to accommodate the rim at the upper edge of the container to be closed, and which, in service, engages the marginal portion of the inner surface of the container at the top.

There remains for consideration the effect produced by shrinkage in the section of plastic material radially exterior of the inner face of groove 38 and which includes the annular section whose width is $d$ and whose depth is $e$. This section includes the flange 36 and the intermediate section 37 connecting the flange with section 35 rimming the fiberboard paneling.

If flange section 36 were merely an annular ring unconnected with the rest of the lid, such shrinkage as occurs, would be in a longitudinal direction and act merely to reduce the circumferential dimension of the flange and consequently its radius. But the fiberboard paneling resists reduction in the circumferential and consequently the radial dimension of plastic rim 31 in the vicinity of the paneling insert and there will be greater resistance to shrinkage in the flange at the top where it is anchored to the rim than at its lower or free edge. Accordingly, a greater reduction in the radial dimension of the flange will occur at the bottom than at the top and this phenomena may be used to effect a corresponding increase in the gripping or sealing effect of the lid upon the walls of the container. This gripping or sealing effect is enhanced by reducing the thickness of the plastic material in section 37 at the closed end of groove 38, since the thinner the wall of the section in this region the greater is the isolation of the effect of inner main body of the plastic rim on the outer flange section. The gripping effect is still further enhanced by the action of inwardly protruding lip 40 at the lower edge of the flange on the outer surface of the container.

Figure 7:
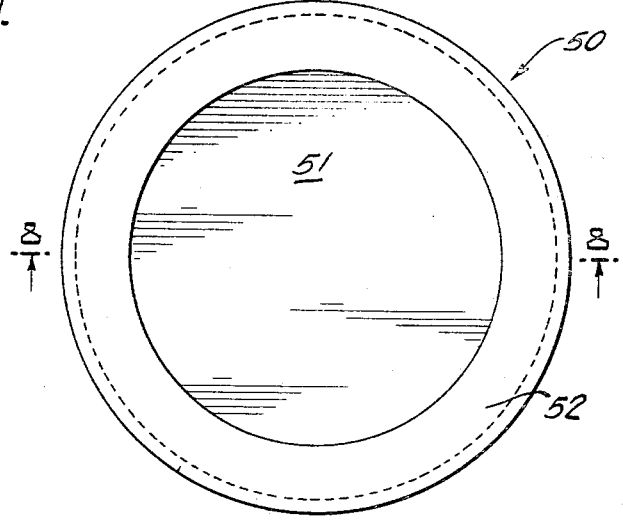
FIG. 7 is a top plan view of a composite container lid illustrating still a different embodiment of the present improvements.

FIGS. 7 and 8 illustrate a lid 50 according to another embodiment of the invention comprising a central circular panel 51 preferably of fiberboard and a peripheral marginal rim or frame 52 of injection molded plastic in which shrinkage forces are present acting longitudinally in the rim and tending to bow the paneling concave downwardly, i.e., toward the interior of the container. The lid is shown as circular but it could be square or substantially square with rounded corners or of some other suitable shape. The plastic rim is injection molded into bonding relation with the paneling material along a marginal area 53 adjacent the peripheral edge 54 of the panel 51.

The plastic rim 52 has a first horizontal flange 55 extending radially inwardly with its underlying surface bonded to the paneling material at the top throughout the marginal area 53. It has a second vertically disposed flange 56 depending from the outer peripheral edge of the first flange and in a direction perpendicular to the panel 51. Bonding preferably exists between the plastic rim and the paneling material along the edge 54 of the latter and a protruding circular nose 57 extending around the inner periphery of the flange 56 may be provided for engaging beneath the bead usually provided at a container rim.

The first flange has a dimension in a direction radially of the lid greater than the dimension of the second flange from top to bottom but they are about of equal thickness. Assuming the plastic used and the fiberboard are sufficiently compatible to provide a good bond at their interface, shrinkage of the plastic at the interface will be at a minimum because of the greater dimensional stability in the fiberboard. The shrinkage tendencies present, however, will be maximum at the outer top face of the flange where no counteracting forces are present. Since shrinkage forces in the flange are in a circumferential direction around the lid, and since their effect is greater near the outer top surface of the flange than adjacent the fiberboard interface, the tendency is for the lid to dish in a direction concave downwardly.

The tendency for the lid to dish concave downwardly is resisted by shrinkage forces acting in the vertical flange 56. Here too shrinkage forces act circumferentially of the flange and, if unopposed, will act to reduce the circumferential dimension and the dimension in a radial direction too. But there is greater resistance to shrinkage near the top of the vertical flange in the region of its bonded engagement with the fiberboard than nearer the bottom where the edge of the flange is free. The greater tendency of the circumferential and consequently the radial dimension of the vertical flange to be reduced near its lower edge acts to counter the shrinkage effect of the horizontal flange but since there is a greater volume of plastic in the horizontal flange the forces acting to dish the lid concave downwardly prevail.

A lid 60 illustrated in FIG. 9 is similar to lid 50 in FIG. 8 in that it has a central area of panel material 61, preferably fiberboard, and a peripheral injection molded plastic rim or frame 62 having a horizontal flange 63 whose inner edge 64 defines the panel area and whose bottom or underlying face 65 is bonded by such injection molding to the corresponding marginal portion of the underlying paneling material. The plastic rim or frame 62 has a vertical flange 66 integral with and depending from the horizontal flange at the outer edge of the paneling material adjacent to which the horizontal flange is bonded. In this embodiment of the invention the relative amounts of plastic material in the vertical flange and in the horizontal flange as well as their dimensions are such that, in accordance with the principles enunciated for FIGS. 7 and 8, any forces tending to shrink the radial dimension of the vertical flange overbalance the forces active in the horizontal flange with the result that the lid will tend to dish concave upwardly.

The lid 70 illustrated in the embodiment of FIG. 10 may be circular or of other appropriate shape and has a central panel 71 preferably of fiberboard rimmed by an injection molded plastic frame section 72. Plastic frame section 72 has a horizontal flange 73 with a bonded interface 74 along a top marginal area of the panel material adjacent its peripheral circumferential edge 75. It also presents a vertical flange 76 with a bonded interface along said circumferential edge of the panel material. From the intersection of these flanges, the circular frame has a semi-circular cross-section 77 curving first upwardly and then downwardly to present a groove 78 opening downwardly to accommodate and fit over the top edge of a container not shown. The semi-circular section 77 continues vertically downwardly in the form of a flange 79 which presents an inwardly extending protuberance 80 around its lower edge to cooperate with the outer face of a container (not shown) to effect a seal with the same when the lid is in service. The bonded interface areas at the edge and along the marginal edge areas of the paneling material are relatively small and the volume of plastic material adjacent such interfaces is correspondingly small. There will be little effect on the part of the plastic material in the vicinity of such interfaces to shrink and accordingly there will be little tendency for the lid to dish one way or the other. The circumferential and consequently the radial dimension of the vertical flange 79 will tend to shrink but its effect is isolated from the fiberboard panel by the semi-circular relatively light section 77.

The lid 90 in the embodiment of the invention illustrated in FIG. 11 may be circular or of any other appropriate shape in plan. It possesses paneling material 91 preferably of fiberboard boardered by an injection molded plastic frame 92 having spaced horizontal peripheral parallel flanges 93, 94 whose opposed inner faces 95, 96, are bonded to the paneling material on opposite sides thereof and over marginal areas of the same size. The flanges are bridged together by a vertical section 97 of plastic which is bonded to the peripheral edge of the panel material and which extends vertically downwardly in the form of a flange 98 to an inwardly extending terminal lip 99 whose function is to grip beneath the reinforced section at the brim of a container (not shown) to hold the lid in place. In instances where the plastic and the paneling material are incompatible an improved interlocking bond between them may be obtained by partially perforating the surface of the panel material adjacent its edges to permit access of the plastic material to the fibers below the surface during the injection molding process as at 100.

In this embodiment of the invention, the tendency of the lid to dish in one direction or the other is counterbalanced in the symmetrical disposition of the flanges 93, 94 above and below the paneling material. Depending flanges 98, by a tendency to reduce its radial dimension from shrinkage in the plastic, might tend to cause dishing of the lid in a direction concave upwardly but this would be slight because of the otherwise balanced construction of the lid. The tendency to dish upwardly in any case would serve to enhance the gripping effect exerted by the lip 99 on the container when the lip is in service.

As previously stated, the paneling material may be fiberboard, metal, plastic or any other suitable material suggested by the function demanded of the paneling material. The plastic material may be polyethylene, polypropylene, polyacrylic, nylon, etc., filled or otherwise, or any other appropriate extrudable thermoplastic and preferably one with a minimum tendency to shrink after molding.

The invention has been illustrated in connection with preferred embodiments thereof but other embodiments are included within its spirit. Its limitations are defined by the scope of the appended claims.

I claim:
1. A composite lid for closing a container having vertical wall portions defining the opening to be closed, said lid comprising an injection molded marginal section of plastic material having a depending flange portion adapted in service to engage and cooperate with a surface of the vertical wall portion of the container adjacent such opening, said plastic marginal section having a peripheral edge disposed inwardly from the outermost peripheral edge of the marginal plastic section and defining panel area, and paneling material closing the area defined by said inwardly disposed peripheral edge, said paneling material being bonded along an outer marginal area to a corresponding area of the plastic material during the injection molding of the latter, and said paneling material having a capability of being impressed prior to molding with identifying indicia capable of surviving said injection molding operation and dimensional stability acting by its bonded engagement with the plastic material to oppose shrinkage in the plastic material in a longitudinal direction along the area of bond as such plastic material cools after molding.

2. A composite container lid according to claim 1 wherein the depending flange portion of the plastic marginal section is adapted in service to engage and cooperate in effecting closure, with the inner surface of the vertical wall portion of the container.

3. A composite container lid according to claim 1 wherein the depending flange portion of the plastic marginal section is adapted in service to engage and cooperate in effecting closure, with the outer surface of the vertical wall portion of the container.

4. A composite container lid according to claim 3 wherein the depending flange portion of the plastic marginal section referred to defines the outer wall of a groove located adjacent the periphery of the lid and adapted to accommodate within it a marginal portion of the container wall at the top thereof.

5. A composite container lid according to claim 1 wherein a depending flange portion of the plastic marginal section is adapted in service to engage and cooperate in effecting closure, with both an inner and an outer surface of the container.

6. A composite container lid according to claim 5 wherein the flange portions of the plastic marginal section depend from a section adjacent the periphery of the container lid adapted to engage the container along its upper edge.

References Cited
UNITED STATES PATENTS 3,184,096  5/1965  Cheeley _____ 220—60
3,331,527  7/1967  Kaas et al. _____ 220—60

JAMES B. MARBERT, *Primary Examiner.*